US011685292B2

(12) United States Patent
Amarasinghe

(10) Patent No.: US 11,685,292 B2
(45) Date of Patent: Jun. 27, 2023

(54) VEHICLE TEMPERATURE MANAGEMENT APPARATUS

(71) Applicant: Daimler AG, Stuttgart (DE)

(72) Inventor: Suwin Indula Amarasinghe, Kawasaki (JP)

(73) Assignee: Daimler AG, Stuttgart (DE)

(*) Notice: Subject to any disclaimer, the term of this patent is extended or adjusted under 35 U.S.C. 154(b) by 467 days.

(21) Appl. No.: 16/643,485

(22) PCT Filed: Jul. 20, 2018

(86) PCT No.: PCT/JP2018/027319
§ 371 (c)(1),
(2) Date: Feb. 28, 2020

(87) PCT Pub. No.: WO2019/044261
PCT Pub. Date: Mar. 7, 2019

(65) Prior Publication Data
US 2020/0189417 A1 Jun. 18, 2020
US 2021/0188124 A9 Jun. 24, 2021

(30) Foreign Application Priority Data

Aug. 31, 2017 (JP) .............................. JP2017-166806

(51) Int. Cl.
B60L 58/24 (2019.01)
H01M 10/613 (2014.01)
(Continued)

(52) U.S. Cl.
CPC .............. B60L 58/24 (2019.02); B60K 11/04 (2013.01); B60L 50/60 (2019.02);
(Continued)

(58) Field of Classification Search
CPC .... B60L 58/24; B60L 50/60; B60L 2240/545; H01M 10/613; H01M 10/615;
(Continued)

(56) References Cited

U.S. PATENT DOCUMENTS 7,975,757 B2 * 7/2011 Nemesh ............ H01M 10/6568
165/42
2005/0178523 A1 8/2005 Itoh et al.
(Continued)

FOREIGN PATENT DOCUMENTS

DE 10 2805 007 322 A1 12/2005
JP 56-149019 U 11/1981
(Continued)

OTHER PUBLICATIONS

PCT/JP2018/027319, International Search Report dated Oct. 23, 2018 (One (1) page).

Primary Examiner — Tho V Duong
Assistant Examiner — Raheena R Malik
(74) Attorney, Agent, or Firm — Crowell & Moring LLP

(57) ABSTRACT

A vehicle temperature management apparatus includes: a channel selection section that selects at least one of a chiller heat exchange channel, a radiator heat exchange channel, and a heater heat exchange channel as a channel of a refrigerant in a refrigerant circulation circuit; a switching control section that controls the channel switching section such that the channel switching section selects at least one of the chiller heat exchange channel, the radiator heat exchange channel, and the heater heat exchange channel; and an operation control section that controls an operation of a chiller. When the radiator heat exchange channel or the heater heat exchange channel is selected as the channel of the refrigerant, the switching control section controls the channel selection section such that the channel selection (Continued)

section further selects the chiller heat exchange channel, and the operation control section does not operate the chiller.

6 Claims, 1 Drawing Sheet

(51) Int. Cl.
| | |
|---|---|
| *H01M 10/615* | (2014.01) |
| *H01M 10/625* | (2014.01) |
| *H01M 10/63* | (2014.01) |
| *H01M 10/6551* | (2014.01) |
| *H01M 10/6556* | (2014.01) |
| *H01M 10/6568* | (2014.01) |
| *B60L 50/60* | (2019.01) |
| *B60K 11/04* | (2006.01) |

(52) U.S. Cl.
CPC ....... *H01M 10/613* (2015.04); *H01M 10/615* (2015.04); *H01M 10/625* (2015.04); *H01M 10/63* (2015.04); *H01M 10/6551* (2015.04); *H01M 10/6556* (2015.04); *H01M 10/6568* (2015.04); *B60L 2240/545* (2013.01); *H01M 2220/20* (2013.01)

(58) Field of Classification Search
CPC .............. H01M 10/625; H01M 10/63; H01M 10/6551; H01M 10/6556; H01M 10/6568; H01M 2220/20; B60K 11/04
USPC ...................................................... 165/80.2
See application file for complete search history.

(56) References Cited

U.S. PATENT DOCUMENTS

| | | | |
|---|---|---|---|
| 2009/0249807 A1* | 10/2009 | Nemesh | B60H 1/00278 62/117 |
| 2017/0106724 A1* | 4/2017 | Porras | H01M 10/44 |
| 2017/0158081 A1* | 6/2017 | Kim | H01M 10/6568 |
| 2019/0016230 A1* | 1/2019 | Wang | B60R 16/04 |

FOREIGN PATENT DOCUMENTS

| | | |
|---|---|---|
| JP | 2005-263200 A | 9/2005 |
| JP | 2009-289563 A | 12/2009 |
| JP | 2010-107156 A | 5/2010 |
| JP | 2014-43181 A | 3/2014 |
| JP | 2014-218211 A | 11/2014 |

* cited by examiner

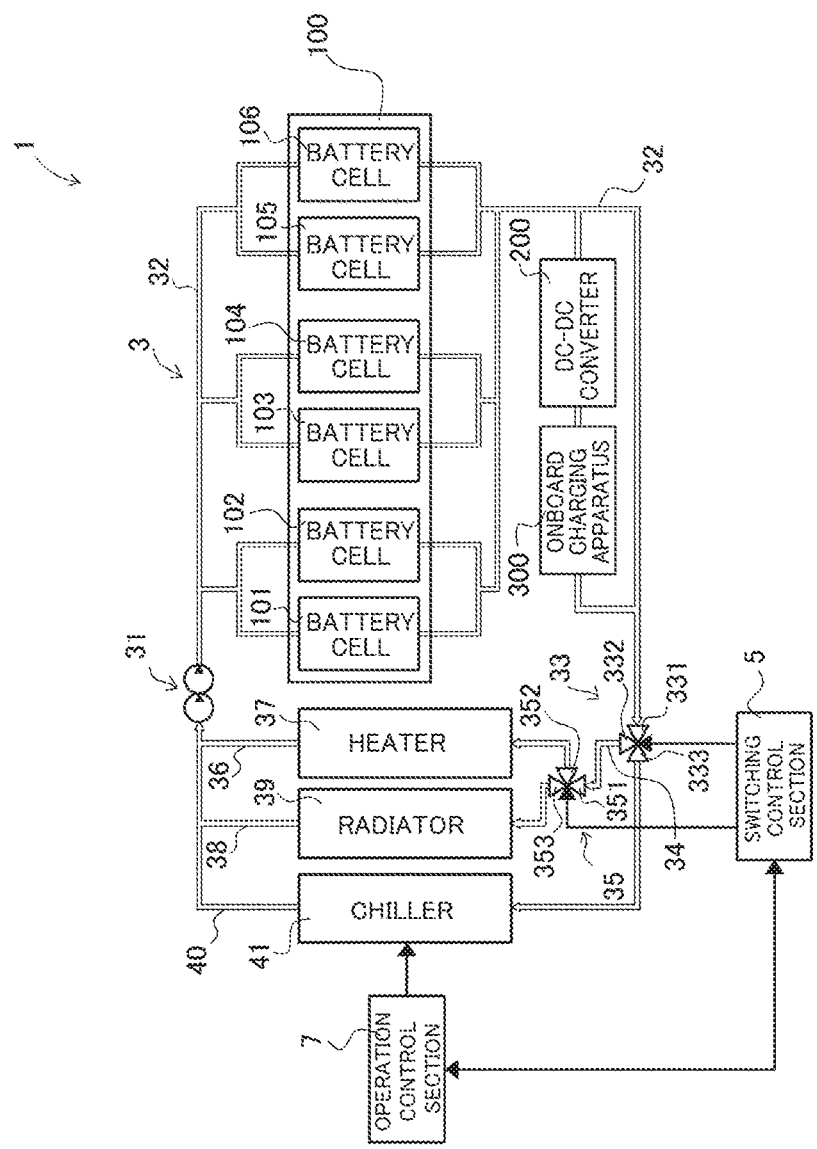

VEHICLE TEMPERATURE MANAGEMENT APPARATUS

TECHNICAL FIELD

The present invention relates to a vehicle temperature management apparatus that performs temperature management of devices mounted on a vehicle.

BACKGROUND ART

For example, as shown in PTL 1 below, a known vehicle temperature management apparatus flows a refrigerant (coolant) in a plurality of target devices mounted on a vehicle and bring the refrigerant into contact with a heater, a chiller, or a radiator for heat exchange, to thereby perform temperature management of the above target device.

CITATION LIST

Patent Literature

[PTL 1] Japanese Patent Application Publication No. 2014-043181

SUMMARY OF INVENTION

Technical Problem

For example, it is conceivable to perform the temperature management of the target device by disposing the heater, the chiller, the radiator, and the target device in parallel to each other in the refrigerant circulation circuit described above. However, in the above refrigerant circulation circuit, a relatively large pressure loss occurs in the heater or the radiator. In order to maintain the flow rate of the refrigerant in the refrigerant circulation circuit, it is necessary to increase the pressure or the refrigerant to be delivered, and hence the size of a pump for circulating the refrigerant is increased. This may increase power consumption required to drive the pump.

The present invention has been made to overcome such a problem, and an object thereof is to provide a vehicle temperature management apparatus capable of reducing the size of a pump for circulating a refrigerant and saving power consumption required for driving the pump.

Solution to Problem

The present invention can be implemented as the following application example.

A vehicle temperature management apparatus according to the present application example includes: a refrigerant circulation circuit for circulating a refrigerant that exchanges heat with a temperature adjustment target device mounted on a vehicle circulates; a chiller heat exchange channel provided in the refrigerant circulation circuit and including a chiller that cools the refrigerant; a radiator heat exchange channel provided in parallel to the chiller heat exchange channel in the refrigerant circulation circuit, the radiator heat exchange channel including a radiator that causes outside air and the refrigerant to exchange heat therebetween to thereby radiate heat from the refrigerant to the outside air; a channel selection section configured to select at least one of the chiller heat exchange channel and the radiator heat exchange channel as a channel of the refrigerant in the refrigerant circulation circuit; a switching control section configured to control the channel selection section such that the channel switching section selects at least one of the chiller heat exchange channel and the radiator heat exchange channel; and an operation control section configured to control an operation of the chiller, and, the switching control section being configured to control, when the radiator heat exchange channel is selected as the channel of the refrigerant, the channel selection section such that the channel selection section selects the radiator heat exchange channel and the chiller heat exchange channel as the channel of the refrigerant, and the operation control section does not operate the chiller.

In the vehicle temperature management apparatus according to the present application example, the switching control section selects the radiator heat exchange channel and the chiller heat exchange channel as the channel of the refrigerant when the target device described above is cooled. At this point, the operation control section does not operate the chiller. It is possible to use the chiller heat exchange channel as a bypass channel by flowing the refrigerant in the radiator heat exchange channel and the chiller heat exchange channel, and hence it is possible to reduce a pressure loss of the refrigerant as compared with the case where the refrigerant is flown only in the radiator heat exchange channel. Accordingly, it is possible to maintain the pressure of the refrigerant in the refrigerant circulation circuit. In addition, the chiller is not operated, and hence the refrigerant is not affected.

Consequently, the vehicle temperature management apparatus according to the present application example is capable of reducing the size of a pump for circulating the refrigerant and saving the power consumption required for driving the pump when the target device is cooled.

In addition, a vehicle temperature management apparatus according to the present application example includes: a refrigerant circulation circuit for circulating a refrigerant that exchanges heat with temperature adjustment target device mounted on a vehicle circulates; a chiller heat exchange channel provided in the refrigerant circulation circuit and including a chiller that cools the refrigerant; a heater heat exchange channel provided in parallel to the chiller heat exchange channel in the refrigerant circulation circuit, the heater heat exchange channel including a heater configured to heat the refrigerant; a channel selection section configured to select either one of the chiller heat exchange channel and the heater heat exchange channel as a channel of the refrigerant in the refrigerant circulation circuit; a switching control section configured to control the channel selection section such that the channel switching section selects one of the chiller heat exchange channel and the heater heat exchange channel; and an operation control section configured to control an operation of the chiller, and the switching control section being configured to control, when the heater heat exchange channel is selected as the channel of the refrigerant, the channel selection section such that the channel selection section selects the heater heat exchange channel and the chiller heat exchange channel as the channel of the refrigerant, and the operation control section does not operate the chiller.

In the vehicle temperature management apparatus according to the present application example, the switching control section selects the heater heat exchange channel and the chiller heat exchange channel as the channel of the refrigerant when the target device described above is heated. At this point, the operation control section does not operate the chiller. It is possible to use the chiller heat exchange channel as the bypass channel by flowing the refrigerant in the heater heat exchange channel and the chiller heat exchange channel, and hence it is possible to reduce the pressure loss of the refrigerant as compared with the case where the refrigerant is flown only in the heater heat exchange channel. Accordingly, it is possible to maintain the pressure of the refrigerant in the refrigerant circulation circuit. In addition, the chiller is not operated, and hence the refrigerant is not affected.

Consequently, when the target device is heated, the vehicle temperature management apparatus according to the present application example is capable of reducing the size of the pump for circulating the refrigerant and saving the power consumption required for driving the pump.

Further, a vehicle temperature management apparatus according to the present application example includes: a refrigerant circulation circuit for circulating a refrigerant that exchanges heat with temperature adjustment target device mounted on a vehicle circulates; a chiller heat exchange channel provided in the refrigerant circulation circuit and including a chiller that cools the refrigerant; a radiator heat exchange channel provided in parallel to the chiller heat exchange channel in the refrigerant circulation circuit, the radiator heat exchange channel including a radiator that causes outside air and the refrigerant to exchange heat therebetween to thereby radiate heat from the refrigerant in the outside air; a heater heat exchange channel provided in parallel to the chiller heat exchange channel in the refrigerant circulation circuit, the heater heat exchange channel including a heater configured to heat the refrigerant; a channel selection section configured to select at least one of the chiller heat exchange channel, the radiator heat exchange channel, and the heater heat exchange channel as a channel of the refrigerant in the refrigerant circulation circuit; a switching control section configured to control the channel selection section such that the channel switching section selects at least one of the chiller heat exchange channel, the radiator heat exchange channel, and the heater heat exchange channel; and an operation control section configured to control an operation of the chiller. When the radiator heat exchange channel or the heater heat exchange channel is selected as the channel of the refrigerant, the switching control section controls the channel selection section such that the channel selection section further selects the chiller heat exchange channel. Then, the operation control section does not operate the chiller when the chiller heat exchange channel is selected.

In the vehicle temperature management apparatus according to the present application example, when the target device described above is heated, the switching control section selects the heater heat exchange channel and the chiller heat exchange channel as the channel of the refrigerant. The operation control section does not operate the chiller. It is possible to use the chiller heat exchange channel as the bypass channel by flowing the refrigerant in the heater heat exchange channel and the chiller heat exchange channel, and hence it is possible to reduce the pressure loss of the refrigerant as compared with the case where the refrigerant is flown only into the heater heat exchange channel. Accordingly, it is possible to maintain the pressure of the refrigerant in the refrigerant circulation circuit. In addition, the chiller is not operated, and hence the refrigerant is not affected.

In addition, when heat of the target device described above is radiated, the switching control section selects the radiator heat exchange channel and the chiller heat exchange channel as the channel of the refrigerant. The operation control section does not operate the chiller. It is possible to use the chiller heat exchange channel as the bypass channel by flowing the refrigerant in the radiator heat exchange channel and the chiller heat exchange channel, and hence it is possible to reduce the pressure loss of the refrigerant as compared with the case where the refrigerant is flown only into the radiator heat exchange channel. Accordingly, it is possible to maintain the pressure of the refrigerant in the refrigerant circulation circuit. In addition, the chiller is not operated, and hence the refrigerant is not affected.

Consequently, when the temperature of the target device is adjusted, the vehicle temperature management apparatus according to the present application example is capable of reducing the size of the pump for circulating the refrigerant and saving the power consumption required for driving the pump.

BRIEF DESCRIPTION OF DRAWINGS

FIG. 1 is a block diagram showing a vehicle temperature management apparatus according to an embodiment of the present invention.

DESCRIPTION OF EMBODIMENTS

Hereinbelow, a vehicle temperature management apparatus according to an embodiment of the present invention will be described with reference to the drawings. Note that the present embodiment is not limited to the contents of the following description, and can be optionally modified and carried out without changing the gist thereof. Drawings which are referred to in the description of the embodiment schematically show components, and partial enhancement, enlargement or reduction in size, or omission of components is performed in the drawing so that understanding is deepened, and there are cases where the drawing does not represent the scale or shape of the component accurately.

FIG. 1 is a block diagram showing a vehicle temperature management apparatus 1 according to the embodiment of the present invention. The vehicle temperature management apparatus 1 shown in FIG. 1 is an apparatus for managing the temperature of temperature adjustment target device mounted on a vehicle such as an electric vehicle or the like. The vehicle temperature management apparatus 1 adjusts the temperature of the target device mentioned above by circulating a refrigerant along a refrigerant circulation circuit 3. For example, the vehicle temperature management apparatus 1 heats a battery 100 that is mounted on a vehicle and supplies power to a motor, keeps the battery 100 warm, or cools the battery 100. In addition, besides the battery 100, the vehicle temperature management apparatus 1 heats a DC-DC converter 200 that is used to transfer power from one battery to another battery, and an onboard charging apparatus (onboard charger) 300 that is used to charge the battery 100, keeps the DC-DC converter 200 and the onboard charging apparatus 300 warm, or cools the DC-DC converter 200 and the onboard charging apparatus 300. The vehicle temperature management apparatus 1 includes the refrigerant circulation circuit 3, a switching control section 5, and an operation control section 7.

The refrigerant circulation circuit 3 is a refrigerant channel for circulating a refrigerant that exchanges heat with the battery 100, the DC-DC converter 200, and the onboard charging apparatus 300. The refrigerant circulation circuit 3 in the present embodiment includes a pump 31, a battery heat exchange channel 32, a valve 33, an inter-valve channel 34, a valve 35, a heater heat exchange channel 36, a radiator heat exchange channel 38, and a chiller heat exchange channel 40.

The pump 31 is an apparatus for circulating the refrigerant filled in the channel in an arrow direction. In the pump 31 in the present embodiment, a discharge amount (delivery amount) of the refrigerant is controlled by a control apparatus that is not shown.

The battery heat exchange channel 32 is a refrigerant channel that connects the pump 31 and the valve 33, and is used to flow the refrigerant delivered from the pump 31 to the valve 33. The battery heat exchange channel 32 is disposed so as to pass near the battery 100, the DC-DC converter 200, and the onboard charging apparatus 300. The battery heat exchange channel 32 is formed of metal such as a steel pipe or the like. For example, the battery heat exchange channel 32 branches to each of a plurality of battery cells 101 to 106 included in the battery 100, and is disposed so as to pass by each of the plurality of battery cells 101 to 106.

The refrigerant delivered from the pump 31 passes near each of the plurality of battery cells 101 to 106 along the battery heat exchange channel 32. The refrigerant that passes near each of the plurality of battery cells 101 to 106 exchanges heat with each of the plurality of battery cells 101 to 106. The refrigerant having exchanged heat with each of the plurality of battery cells 101 to 106 is collected in one channel. Further, the refrigerant collected in one channel is branched and is made flown into each of a channel including the DC-DC converter 200 and the onboard charging apparatus 300, and a bypass channel that does not have a heat exchange configuration. The refrigerant branched and made flown into the channel including the DC-DC converter 200 and the onboard charging apparatus 300 exchanges heat with the DC-DC converter 200 and the onboard charging apparatus 300, and flows to the valve 33. The refrigerant branched and made flown into the bypass channel flows to the valve 33 directly.

The valve (channel selection section) 33 is a three-way solenoid valve that includes a first port 331 connected to the battery heat exchange channel 32, a second port 332 connected to the inter-valve channel 34, and a third port 333 connected to the chiller heat exchange channel 40. The valve 33 is formed of metal such as iron or resin such as rubber. The valve 33 in the present embodiment executes opening and closing each port with the switching control section 5 described later.

The inter-valve channel 34 is a refrigerant channel that connects the valve 33 and the valve 35, and is used to flow the refrigerant discharged from the second port 332 of the valve 33 described above to the valve 35. The inter-valve channel 34 is formed of metal such as a steel pipe or the like.

The valve (channel selection section) 35 is a three-way solenoid valve that includes a first port 351 connected to the inter-valve channel 34, a second port 352 connected to the heater heat exchange channel 36, and a third port 353 connected to the radiator heat exchange channel 38. The valve 35 is formed of metal such as iron or resin such as rubber. The valve 35 in the present embodiment executes opening and closing each port with the switching control section 5 described later.

The heater heat exchange channel 36 is a refrigerant channel that connects the second port 352 of the valve 35 and the pump 31, and is used to flow the refrigerant discharged from the second port 352 of the valve 35 described above to the pump 31. The heater heat exchange channel 36 is formed of metal such as a steel pipe or the like. The heater heat exchange channel 36 is provided with, e.g., a heater 37 that heats the refrigerant. The refrigerant that passes through the heater 37 is heated by the heater 37. Note that the operation of the heater 37 is controlled by a control apparatus that is not shown. The refrigerant heated by the heater 37 flows to the pump 31, and circulates in the refrigerant circulation circuit 3 again. Note that the heater heat exchange channel 36 shares a partial section before the pump 31 with the radiator heat exchange channel 33 and the chiller heat exchange channel 40.

The radiator heat exchange channel 38 is a refrigerant channel that connects the third port 353 of the valve 35 and the pump 31, and is used to flow the refrigerant discharged from the third port 353 of the valve 35 described above to the pump 31. The radiator heat exchange channel 38 is formed of metal such as a steel pipe or the like. The radiator heat exchange channel 38 is provided with, e.g., a radiator 39 that radiates heat of the refrigerant. The refrigerant that passes through the radiator 39 exchanges heat with outside air using the radiator 39, and the heat is radiated into the outside air. The refrigerant, the heat from which has been radiated by the radiator 39 flows to the pump 31, and circulates in the refrigerant circulation circuit 3 again.

The chiller heat exchange channel 40 is a refrigerant channel that connects the third port 333 of the valve 33 and the pump 31, and is used to flow the refrigerant discharged from the third port 333 of the valve 33 described above to the pump 31. The chiller heat exchange channel 40 is formed of metal such as a steel pipe or the like. The chiller heat exchange channel 40 is provided with, e.g., a chiller 41 that cools the refrigerant. The chiller 41 is an apparatus for causing a working fluid that is liquefied and condensed by a condenser that is not shown and the refrigerant that circulates in the refrigerant circulation circuit 3 to exchange heat therebetween. The refrigerant that passes through the chiller 41 is cooled by the chiller 41. Specifically, the working fluid evaporates in the chiller 41 and takes heat from the refrigerant, and the refrigerant is thereby cooled. The refrigerant cooled by the chiller 41 flows to the pump 31, and circulates in the refrigerant circulation circuit 3 again.

The switching control section 5 includes a predetermined processor such as a CPU (Central Processing Unit)/an MPU (Micro Processing Unit), or the like as a hardware resource. For example, the switching control section 5 selects at least one of the heater heat exchange channel 36, the radiator heat exchange channel 38, and the chiller heat exchange channel 40 as the channel of the refrigerant. For example, in order to select the channel of the refrigerant, the switching control section 5 executes opening-closing control of the valve 33 and the valve 35. The vehicle temperature management apparatus 1 according to the present embodiment adjusts the temperature of target device to a desired temperature by selecting at least one of the heater heat exchange channel 36, the radiator heat exchange channel 38, and the chiller heat exchange channel 40 as the channel of the refrigerant. The operation control section 7 includes a predetermined processor such as a CPU, an MPU, or the like as a hardware resource. For example, the operation control section 7 controls the operation of the chiller 41 provided in the chiller heat exchange channel 40.

Herein, a detailed description will be given of switching control of the channel in the switching control section 5 and operation control of the chiller 41 in the operation control section 7.

First, when the target device described above is heated, the switching control section 5 in the present embodiment selects the heater heat exchange channel 36 and the chiller heat exchange channel 40 as the channel of the refrigerant. Specifically, the switching control section 5 opens the first port 331, the second port 332, and the third port 333 of the valve 33. In addition, the switching control section 5 opens the first port 351 and the second port 352 of the valve 35, and closes the third port 353 thereof. The operation control section 7 does not operate the chiller 41. With this configuration, the refrigerant is flown into the heater heat exchange channel 36, and the refrigerant is heated by the heater 37. In addition, the refrigerant is flown into the chiller heat exchange channel 40. Further, the heated refrigerant passes by each of the plurality of battery cells 101 to 106 via the pump 31 and the battery heat exchange channel 32. With this configuration, it is possible to heat the plurality of battery cells 101 to 106.

Herein, the pressure of the refrigerant flown into the chiller heat exchange channel 40 is higher than the pressure of the refrigerant flown into the heater heat exchange channel 36. This is because a relatively large pressure loss occurs in the heater 37. In other words, by flowing the refrigerant in the heater heat exchange channel 36 and the chiller heat exchange channel 40, it is possible to reduce the pressure loss of the refrigerant as compared with the case where the refrigerant is flown only into the heater heat exchange channel 36. Accordingly/it is possible to maintain the pressure of the refrigerant in the refrigerant circulation circuit. That is, the vehicle temperature management apparatus 1 according to the present embodiment is capable of reducing the size of the pump 31 for circulating the refrigerant and saving the power consumption required for driving of the pump. In addition, the chiller 41 is not operated, and hence the refrigerant is not affected.

Next, when the heat of the target device described above is radiated, the switching control section 5 in the present embodiment selects the radiator heat exchange channel 38 and the chiller heat exchange channel 40 as the channel of the refrigerant. Specifically, the switching control section 5 opens the first port 331, the third port 333, and the second port 332 of the valve 33. In addition, the switching control section 5 opens the first port 351 and the third port 353 of the valve 35, and closes the second port 352 thereof. The operation control section 7 does not operate the chiller 41. With this configuration, the refrigerant is flown into the radiator heat exchange channel 38, and the heat of the refrigerant is radiated by the radiator 39. In addition, the refrigerant is flown into the chiller heat exchange channel 40. Further, the refrigerant, the heat of which has been radiated, passes by each of the plurality of battery cells 101 to 106 via the pump 31 and the battery heat exchange channel 32. With this configuration, it is possible to radiate heat of the plurality of battery cells 101 to 106.

Herein, the pressure of the refrigerant flown into the chiller heat exchange channel 40 is higher than the pressure of the refrigerant flown into the radiator heat exchange channel 38. This is because a relatively large pressure loss occurs in the radiator 39. In other words, by flowing the refrigerant in the radiator heat exchange channel 38 and the chiller heat exchange channel 40, it is possible to reduce the pressure loss of the refrigerant as compared with the case where the refrigerant is flown only into the radiator heat exchange channel 38. Accordingly, it is possible to maintain the pressure of the refrigerant in the refrigerant circulation circuit. That is, the vehicle temperature management apparatus 1 according to the present embodiment is capable of reducing the size of the pump 31 for circulating the refrigerant and saving the power consumption required for driving the pump. In addition, the chiller 41 is not operated, and hence the refrigerant is not affected.

Next, when the target device described above is cooled, the switching control section 5 in the present embodiment selects the chiller heat exchange channel 40 as the channel of the refrigerant. Specifically, the switching control section 5 opens the first port 331 and the third port 333 of the valve 33, and closes the second port 332 thereof. The operation control section 7 operates the chiller 41. With this configuration, the refrigerant is flown into the chiller heat exchange channel 40, and the refrigerant is cooled by the chiller 41. Further, the cooled refrigerant passes by each of the plurality of battery cells 101 to 106 via the pump 31 and the battery heat exchange channel 32. With this configuration, it is possible to cool the plurality of battery cells 101 to 106.

SUMMARY

As described above, the vehicle temperature management apparatus 1 according to the present embodiment includes the refrigerant circulation circuit 3 for circulating the refrigerant that exchanges heat with the temperature adjustment target device mounted on a vehicle, the chiller heat exchange channel 40 provided in the refrigerant circulation circuit 3 and including the chiller 41 that cools the refrigerant, the radiator heat exchange channel 38 that is provided in parallel to the chiller heat exchange channel 40 in the refrigerant circulation circuit 3, and includes the radiator 39 that causes the outside air and the refrigerant to exchange heat therebetween to thereby radiate the heat from the refrigerant to the outside air, the heater heat exchange channel 36 that is provided in parallel to the chiller heat exchange channel 40 and the radiator heat exchange channel 38 in the refrigerant circulation circuit 3, and includes the heater 37 that heats the refrigerant, the valve 33 and the valve 35 that select at least one of the chiller heat exchange channel 40, the radiator heat exchange channel 38, and the heater heat exchange channel 36 as the channel of the refrigerant in the refrigerant circulation circuit 3, the switching control section 5 that controls the valve 33 and the valve 35 such that the valve 33 and the valve 35 select at least one of the chiller heat exchange channel 40, the radiator heat exchange channel 38, and the heater heat exchange channel 36, and the operation control section 7 that controls the operation of the chiller.

According to the above configuration, in the vehicle temperature management apparatus 1 according to the present embodiment, when the target device described above is heated, the switching control section 5 selects the heater heat exchange channel 36 and the chiller heat exchange channel 40 as the channel of the refrigerant. The operation control section 7 does not operate the chiller 41. With this configuration, the refrigerant is flown into the heater heat exchange channel 36, and the refrigerant is heated by the heater 37. In addition, the refrigerant is flown into the chiller heat exchange channel 40. Further, the heated refrigerant passes by each of the plurality of battery cells 101 to 106 via the pump 31 and the battery heat exchange channel 32. With this configuration, it is possible to heat the plurality of battery cells 101 to 106. In addition, it is possible to use the chiller heat exchange channel 40 as the bypass channel by flowing the refrigerant in the heater heat exchange channel 36 and the chiller heat exchange channel 40, and hence it is possible to reduce the pressure loss of the refrigerant as compared with the case where the refrigerant is flown only into the heater heat exchange channel 36. Accordingly, it is possible to maintain the pressure of the refrigerant in the refrigerant circulation circuit. In addition, the chiller 41 is not operated, and hence the refrigerant is not affected.

Next, when the heat of the target device described above is radiated, the switching control section 5 in the present embodiment selects the radiator heat exchange channel 38 and the chiller heat exchange channel 40 as the channel of the refrigerant. The operation control section 7 does not operate the chiller 41. With this configuration, the refrigerant is flown into the radiator heat exchange channel 38, and the heat of the refrigerant is radiated by the radiator 39. In addition, the refrigerant is flown into the chiller heat exchange channel 40. Further, the refrigerant, the heat of which, has been radiated passes by each of the plurality of battery cells 101 to 106 via the pump 31 and the battery heat exchange channel 32. With this configuration, it is possible to radiate the heat of the plurality of battery cells 101 to 106. In addition, it is possible to use the chiller heat exchange channel 40 as the bypass channel by flowing the refrigerant in the radiator heat exchange channel 38 and the chiller heat exchange channel 40, and hence it is possible to reduce the pressure loss of the refrigerant as compared with the case where the refrigerant is flown only into the radiator heat exchange channel 38. Accordingly, it is possible to maintain the pressure of the refrigerant in the refrigerant circulation circuit. In addition, the chiller 41 is not operated, and hence the refrigerant is not affected.

Thus, the vehicle temperature management apparatus 1 according to the present embodiment is capable of reducing the size of the pump 31 for circulating the refrigerant and saving the power consumption required for driving the pump.

In addition, the vehicle temperature management apparatus 1 according to the present embodiment can work at a lower rotational speed while maintaining the same flow rate, and hence the vehicle temperature management apparatus 1 is capable of reducing energy consumption of the pump 31. As a result, the vehicle temperature management apparatus 1 according to the present embodiment achieves improvements in energy efficiency and mileage.

In order to reduce the pressure loss of the refrigerant, it is conceivable to provide a dedicated bypass channel that bypasses the heater 37, the radiator 39, and the chiller 41. However, when the dedicated bypass line is provided, space for providing the dedicated bypass line and additional cost are necessary. Meanwhile, in the vehicle temperature management apparatus 1 according to the present embodiment, the chiller heat exchange channel 40 is used as the bypass channel, and hence it is possible to reduce the pressure loss of the refrigerant without increasing the number of components such as a valve or enlarging a complicated circuit configuration.

Note that, in the vehicle temperature management apparatus 1 according to the embodiment described above, the battery 100 includes the plurality of battery cells 101 to 106. However, the vehicle temperature management apparatus 1 according to the present embodiment is not limited thereto. For example, the vehicle temperature management apparatus 1 according to the present embodiment may also be applied to a battery module having a large capacity that can be mounted on a vehicle alone.

In addition, the words "predetermined processor" used in the above description mean, e.g., a dedicated or general-purpose processor. Further, each constituent element (each process section) of the present embodiment may be implemented not only by a single processor but also by a plurality of processors. Furthermore, a plurality of constituent elements (a plurality of process sections) may be implemented by a single processor.

REFERENCE SIGNS LIST

1 Vehicle temperature management apparatus
3 Refrigerant circulation circuit
5 Switching control section
7 Operation control section
31 Pump
32 Battery heat exchange channel
33 Valve
34 Inter-valve channel
35 Valve
36 Heater heat exchange channel
37 Heater
38 Radiator heat exchange channel
39 Radiator
40 Chiller heat exchange channel
41 Chiller
100 Battery
101 to 106 Battery cell
200 DC-DC converter
300 Onboard charging apparatus (Onboard charger)

The invention claimed is:

1. A vehicle temperature management apparatus, comprising:
a refrigerant circulation circuit for circulating a refrigerant that exchanges heat with a temperature adjustment target device mounted on a vehicle;
a chiller heat exchange channel provided in the refrigerant circulation circuit and including a chiller that cools the refrigerant;
a radiator heat exchange channel provided in parallel to the chiller heat exchange channel in the refrigerant circulation circuit, the radiator heat exchange channel including a radiator that causes outside air and the refrigerant to exchange heat therebetween to thereby radiate heat from the refrigerant to the outside air;
a channel selection section configured to select at least one of the chiller heat exchange channel and the radiator heat exchange channel as a channel of the refrigerant in the refrigerant circulation circuit;
a switching control section configured to control the channel selection section such that the channel selection section selects at least one of the chiller heat exchange channel and the radiator heat exchange channel; and
an operation control section configured to control an operation of the chiller,
the switching control section configured to control, when the radiator heat exchange channel is selected as the channel of the refrigerant, the channel selection section such that the channel selection section selects the radiator heat exchange channel and the chiller heat exchange channel as the channel of the refrigerant, and the operation control section does not operate the chiller.

2. The vehicle temperature management apparatus according to claim 1, wherein the temperature adjustment target device is a battery for driving the vehicle.

3. A vehicle temperature management apparatus comprising:
a refrigerant circulation circuit for circulating a refrigerant that exchanges heat with a temperature adjustment target device mounted on a vehicle;
a chiller heat exchange channel provided in the refrigerant circulation circuit and including a chiller that cools the refrigerant;
a heater heat exchange channel provided in parallel to the chiller heat exchange channel in the refrigerant circulation circuit, the heater heat exchange channel including a heater configured to heat the refrigerant;
a channel selection section configured to select at least one of the chiller heat exchange channel and the heater heat exchange channel as a channel of the refrigerant in the refrigerant circulation circuit;

a switching control section configured to control the channel selection section such that the channel selection section selects at least one of the chiller heat exchange channel and the heater heat exchange channel; and an operation control section configured to control an operation of the chiller, the switching control section configured to control, when the heater heat exchange channel is selected as the channel of the refrigerant, the channel selection section such that the channel selection section selects the heater heat exchange channel and the chiller heat exchange channel as the channel of the refrigerant, and the operation control section does not operate the chiller.

4. The vehicle temperature management apparatus according to claim 3, wherein the temperature adjustment target device is a battery for driving the vehicle.

5. A vehicle temperature management apparatus comprising:

a refrigerant circulation circuit for circulating a refrigerant that exchanges heat with a temperature adjustment target device mounted on a vehicle;

a chiller heat exchange channel provided in the refrigerant circulation circuit and including a chiller that cools the refrigerant;

a radiator heat exchange channel provided in parallel to the chiller heat exchange channel in the refrigerant circulation circuit, the radiator heat exchange channel including a radiator that causes outside air and the refrigerant to exchange heat therebetween to thereby radiate heat from the refrigerant to the outside air;

a heater heat exchange channel provided in parallel to the chiller heat exchange channel in the refrigerant circulation circuit, the heater heat exchange channel including a heater configured to heat the refrigerant;

a channel selection section configured to select at least one of the chiller heat exchange channel, the radiator heat exchange channel, and the heater heat exchange channel as a channel of the refrigerant in the refrigerant circulation circuit;

a switching control section configured to control the channel selection section such that the channel selection section selects at least one of the chiller heat exchange channel, the radiator heat exchange channel, and the heater heat exchange channel; and an operation control section configured to control an operation of the chiller, the switching control section configured to control, when the radiator heat exchange channel or the heater heat exchange channel is selected as the channel of the refrigerant, the channel selection section such that the channel selection section further selects the chiller heat exchange channel, and the operation control section does not operate the chiller.

6. The vehicle temperature management apparatus according to claim 5, wherein the temperature adjustment target device is a battery for driving the vehicle.

* * * * *